Sept. 27, 1966 U. A. POMMERENING 3,276,011

DIGITAL-TO-ANALOG CONVERTER

Filed Nov. 8, 1963 2 Sheets-Sheet 1

INVENTOR.
UWE A. POMMERENING

BY Robert L. Nathans

ATTORNEY

Sept. 27, 1966 U. A. POMMERENING 3,276,011

DIGITAL-TO-ANALOG CONVERTER

Filed Nov. 8, 1963 2 Sheets-Sheet 2

3,276,011
DIGITAL-TO-ANALOG CONVERTER
Uwe A. Pommerening, Webster, N.Y., assignor to General Dynamics Corporation, a corporation of Delaware
Filed Nov. 8, 1963, Ser. No. 322,374
7 Claims. (Cl. 340—347)

The present invention relates to conversion circuitry for translating binary data into equivalent analog voltages.

In electrical data handling apparatus, it is often required to convert binary data emerging from a dynamic store or a transmission line into its analog equivalent. One common method of affecting conversion is to utilize a "weighted" resistance current summing ladder network operating in conjunction with constant current sources which are switched in and out of the ladder network depending upon the binary code to be converted. This method often yields inaccurate results due to changes in circuit parameters. A second method is to insert the binary data into a bank of flip-flops which temporarily store the data to be converted. Both the "0" and "1" output terminals are connected to triple input AND gates which convert the stored binary number into a decimal or "one out of *n*" equivalent. Each gate is associated with a particular voltage level which represents the analog equivalent of the digit represented by the fully enabled AND gate. The output of the fully enabled AND gate causes a particular associated voltage level to be forwarded to an output circuit to complete the conversion process. It is desirable from an economical standpoint to eliminate the aforementioned flip-flops and to reduce the complexity of the gating circuitry which converts the binary input into a "one out of *n*" signal.

Accordingly, it is the principal object of the present invention to provide a digital-to-analog converter utilizing the second method set forth hereinabove which is simpler and less expensive compared to prior art converters of this type.

Other objects and advantages of the invention will become apparent as the following description proceeds and the features of novelty which characterize the invention will be pointed out with particularity in the claims annexed to and forming a part of this specification.

Figure 1:
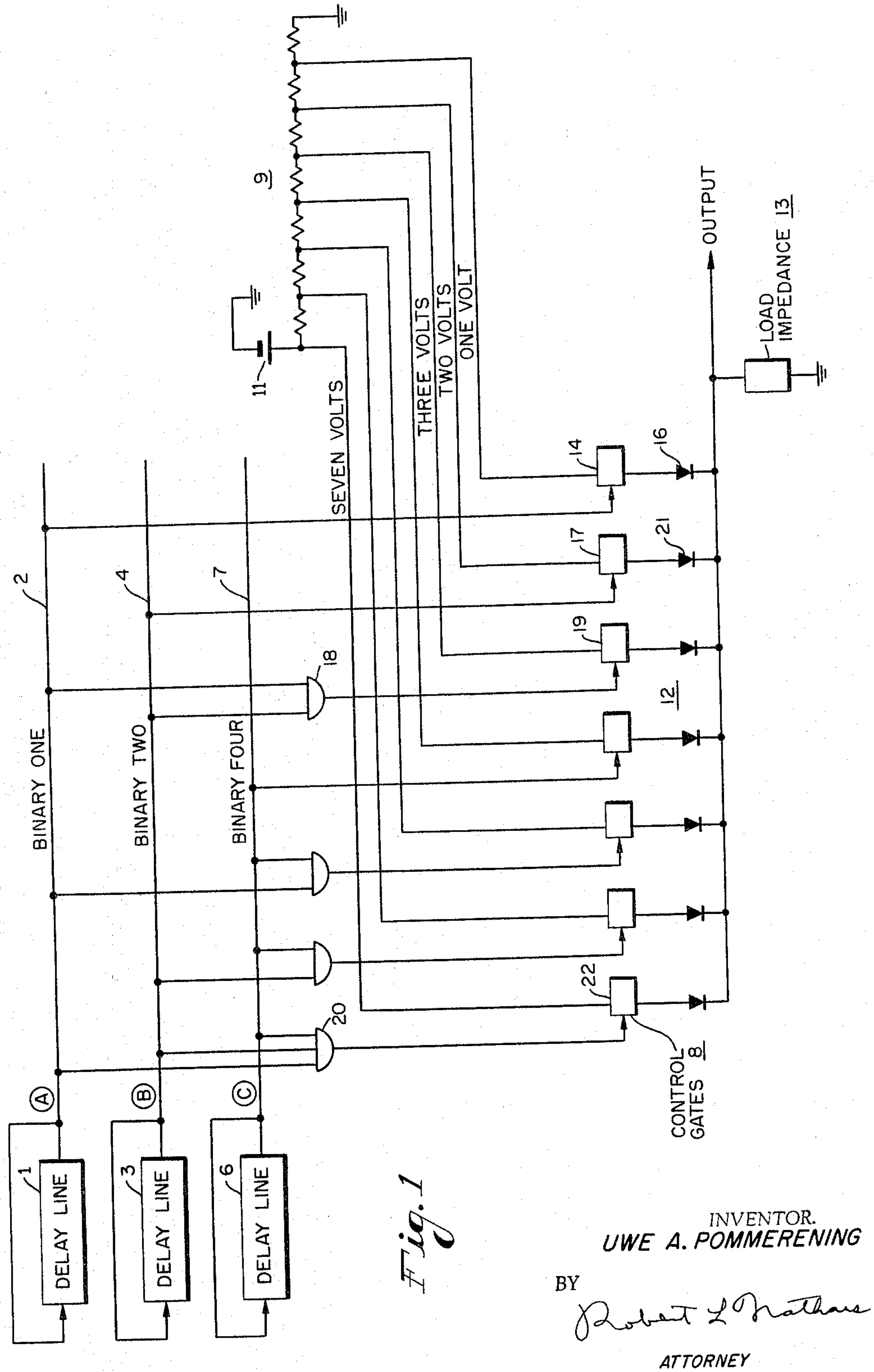

For a better understanding of the invention, reference may be had to the accompanying drawings, in which:

FIG. 1 discloses a preferred embodiment of the present invention; and

Figure 2:
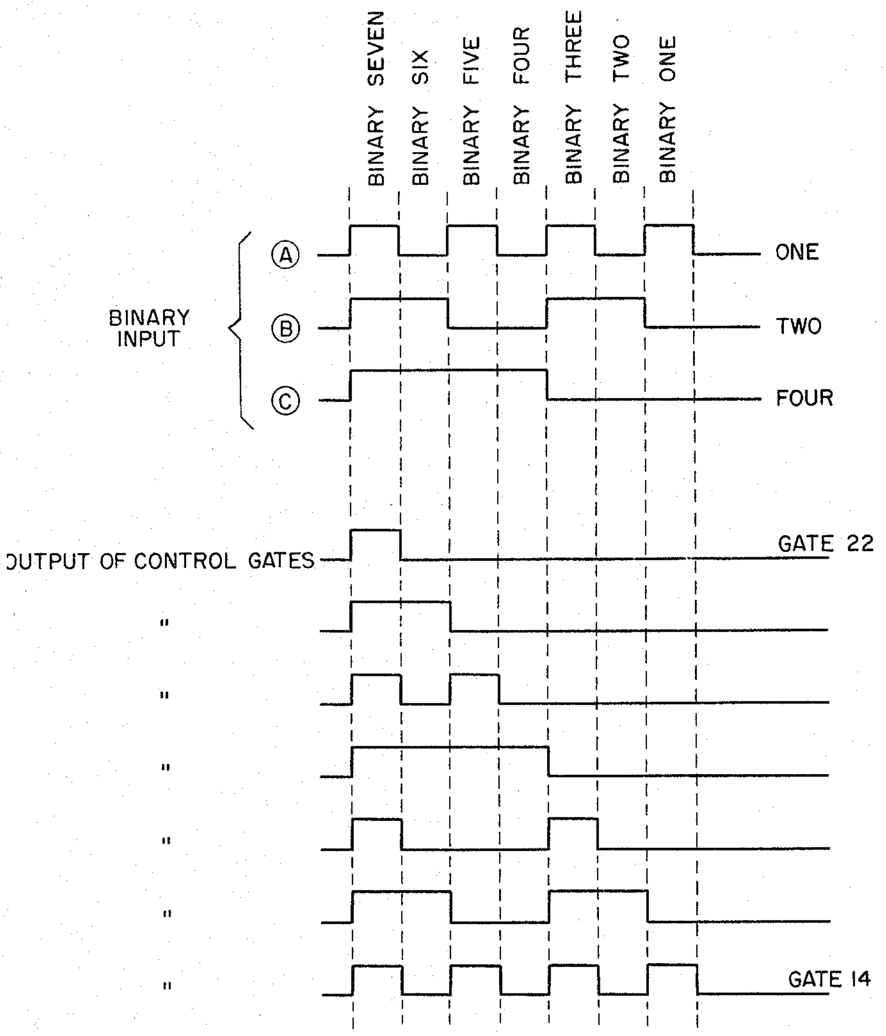

FIG. 2 discloses a pulse diagram which will be helpful in the understanding of the operation of the converter disclosed in FIG. 1.

In accordance with the present invention, a plurality of D.C. voltage sources are provided, each of which is connected to the input terminal of an associated sampling gate, which gate when enabled will tend to impress the particular voltage level across an output impedance. A dynamic source of binary data is coupled via a matrix to the enabling terminals of the control gates and, as a result, various ones of the control gates will be enabled, thereby to tend to impress the associated voltage levels across the output impedance. The circuit is designed so that only the highest voltage level which is associated with one of the enabled control gates will be impressed across the output impedance, while all other lesser voltage levels associated with any other enabled control gates will have no effect on the output impedance. This method of operation is made possible by connecting unidirectional conduction devices, such as diodes, between the output terminals of the control gates and the output impedance. As a result of this arrangement, the formerly required flip-flops are eliminated and the complexity of the formerly required AND gate configuration is considerably reduced.

Referring now to FIG. 1, a recirculating delay line 1 is schematically disclosed coupled to binary one conductor 2 at point A. Recirculating delay line 3 is coupled to binary two conductor 4 at point B, while recirculating delay line 6 is coupled to binary four conductor 7 at point C. Accordingly, during a certain time period a binary number stored within a particular recirculating "time slot" will be impressed upon conductors 2, 4 and 7. The upper portion of FIG. 2 discloses the marking pattern which will be impressed upon conductors 2, 4 and 7 for the various binary numbers. A plurality of control gates 8 are schematically disclosed having their input terminals coupled to various points of a voltage divider network 9. The voltage divider network 9 comprises a seven-volt battery 11 and a plurality of resistors connected in series, as shown. Control gates 8 have enabling terminals either connected directly, or through AND gates, to conductors 2, 4 and 7, as shown. When marks are applied to the enabling terminals of control gates 8, the particular voltage levels associated with the control gates are applied by the gates to the anodes of diodes 12. The cathodes of diodes 12 are connected to the output circuit which is schematically represented by load impedance 13.

Let it be assumed that a binary one has just emerged from the bank of delay lines. As indicated in FIG. 2, a mark will be present on conductor 2 only and, accordingly, only control gate 14 will be enabled so as to apply the one-volt level associated with control gate 14 to the anode of diode 16. As a result, one volt will be impressed across load impedance 13 and the binary one will therefore be translated into its one-volt analog equivalent. The conversion of a binary two will involve only the enabling of control gate 17, so that two volts are impressed across load impedance 13. In the case of the conversion of a binary three, AND gate 18 will become fully enabled thereby to enable control gate 19 and, as a result, three volts will be impressed across load impedance 13. However, under these circumstances, control gates 14 and 17 will also be enabled, so that in the absence of diodes 12 an erroneous ZI drop will be produced across load impedance 13. This is why three terminal AND gates were necessary previously. However, under these circumstances, diodes 16 and 21 will be back biased so that only the three-volt level associated with control gate 19 will affect the output circuit since the cathodes of diodes 16 and 21 will be more positive than the anodes of diodes 16 and 21. If a binary seven has emerged from the delay line bank, AND gate 20 will become fully enabled thereby to enable control gate 22 which causes the seven-volt level to be impressed across load impedance 13. Under these circumstances, all other control gates will also be enabled, but the anodes of the diodes associated with these control gates will be less positive than seven volts and, accordingly, all other voltage levels have no effect on the output circuit. By inspection, it should be obvious that the translation of any intermediate binary number will cause all diodes associated with each and every lower number to be back biased, so that accurate conversion is attained regardless of which number is converted.

The prior art converters of this type required flip-flops because both the "0" and "1" outputs were needed to enable one, and only one, three-input terminal AND gate which, in turn, forwarded only one voltage level to the output circuit. Of course, by eliminating the flip-flops and the three-terminal AND gates, more than one of the voltage level control gates are enabled.

While there has been shown and described a specific embodiment of the invention, other modifications will readily occur to those skilled in the art. It is not, therefore, desired that this invention be limited to the specific arrangement shown and described, and it is intended in the appended claims to cover all modifications within the spirit and scope of the invention.

What is claimed is:

1. A digital-to-analog converter comprising a plurality of conductors, means for marking various ones of said first plurality of conductors in accordance with a binary code, a plurality of control gates each having an input terminal, an output terminal and a control terminal, means coupled between said plurality of conductors and the control terminals of said control gates to enable various ones of said control gates depending upon the binary code impressed upon said plurality of conductors, means for providing a plurality of different voltage levels each associated with a different one of said control gates, means for applying each of said voltage levels to the input terminal of its associated control gate, an output impedance, and means coupled between the output terminals of said control gates and said output impedance for causing current to flow through said output impedance and that one enabled control gate associated with the highest voltage level compared to the levels associated with other enabled control gates and for preventing current from flowing through any other enabled or disenabled control gate.

2. The combination as set forth in claim 1 wherein said last-named means includes a plurality of unidirectional conduction devices each of which is coupled between the output terminal of a different one of said control gates and said output impedance.

3. A digital-to-analog converter comprising a plurality of conductors, means for marking various ones of said first plurality of conductors in accordance with a binary code, a plurality of control gates each having an input terminal, an output terminal and a control terminal, means coupled between said plurality of conductors and the control terminals of said control gates to enable various ones of said control gates depending upon the binary code impressed upon said plurality of conductors, means for providing a plurality of different D.C. voltage levels each associated with a different one of said control gates, means for applying each D.C. voltage level to the input terminal of its associated control gate, an output impedance, means coupled between the output terminals of said control gates and said output impedance for causing current to flow through said output impedance and that one enabled control gate associated with the highest voltage level compared to the level associated with other enabled control gates and for preventing current from flowing through any other enabled or disenabled control gate.

4. The combination as set forth in claim 3 wherein said last-named means includes a plurality of unidirectional conduction devices each of which is coupled between the output terminal of a different one of said control gates and said output impedance.

5. A digital-to-analog converter comprising a plurality of control gates each having an input terminal, an output terminal and a control terminal, a binary data source coupled to the control terminals of said control gates to enable various ones of said control gates depending upon a particular code to be translated, a source of voltage providing a plurality of different voltage levels each associated with a different one of said control gates, means coupled to said source for applying each voltage level to the input terminal of its associated control gate, an output impedance, means coupled between the output terminals of said control gates and said output impedance for causing current to flow through said output impedance and that one enabled control gate associated with the highest voltage level compared to the voltage levels associated with other enabled control gates and for preventing current from flowing through any other enabled or disenabled control gate.

6. The combination as set forth in claim 5 wherein said voltage source is a D.C. source.

7. The combination as set forth in claim 5 wherein said last-named means includes a plurality of diodes connected between the output terminal of different ones of said control gates and said output impedance and polarized in the same direction.

No references cited.

MAYNARD R. WILBUR, *Primary Examiner.*

DARYL W. COOK, *Examiner.*

K. R. STEVENS, *Assistant Examiner.*